(12) United States Patent
Perez

(10) Patent No.: US 10,778,578 B2
(45) Date of Patent: Sep. 15, 2020

(54) METHOD AND SYSTEM HAVING AN APPLICATION FOR IPV6 EXTENSION HEADERS AND DESTINATION OPTIONS

(71) Applicant: KONICA MINOLTA LABORATORY U.S.A., INC., San Mateo, CA (US)

(72) Inventor: Maria Perez, Half Moon Bay, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 164 days.

(21) Appl. No.: 15/692,525

(22) Filed: Aug. 31, 2017

(65) Prior Publication Data
US 2019/0068498 A1    Feb. 28, 2019

(51) Int. Cl.
*H04L 12/749* (2013.01)
*H04L 29/12* (2006.01)
*H04N 1/00* (2006.01)
*H04L 29/06* (2006.01)
*H04L 12/24* (2006.01)

(52) U.S. Cl.
CPC ........ *H04L 45/741* (2013.01); *H04L 29/0653* (2013.01); *H04L 61/10* (2013.01); *H04N 1/00217* (2013.01); *H04L 41/0893* (2013.01); *H04L 61/6059* (2013.01); *H04L 61/6086* (2013.01); *H04N 2201/0027* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,432,907 B2 | 4/2013 | Perez | |
| 8,699,483 B2 | 4/2014 | Perez | |
| 2005/0232277 A1* | 10/2005 | See | H04L 69/22 370/395.52 |
| 2005/0268332 A1* | 12/2005 | Le | H04L 63/0263 726/11 |
| 2008/0049679 A1* | 2/2008 | Suh | H04W 8/26 370/331 |

(Continued)

*Primary Examiner* — Ayaz R Sheikh
*Assistant Examiner* — Faiyazkhan Ghafoerkhan
(74) *Attorney, Agent, or Firm* — Buchanan Ingersoll & Rooney PC

(57) ABSTRACT

A system that facilitates processing of data packets in an Internet Protocol (IP) network environment, which includes a computer device having an Internet Protocol version 6 (IPv6) extensions application, and wherein the IPv6 extensions application performs the following steps: setting an IPv6 extension header policy for the computer device; retrieving an original IPv6 packet from a network stack on the computer device, the original IPv6 packet having an extension header or destination option; determining if a designated route in the extension header or destination option is in accordance with the IPv6 extension header policy for the computer device; and if the designated route is in accordance with the IPv6 extension header policy, modifying the extension header or destination option for the computer device to generate a modified IPv6 packet, and sending the modified IPv6 packet on the IPv6 network.

20 Claims, 4 Drawing Sheets

(56) References Cited

U.S. PATENT DOCUMENTS

| | | | |
|---|---|---|---|
| 2008/0069030 A1* | 3/2008 | Hirano | H04W 8/12 370/328 |
| 2008/0159288 A1* | 7/2008 | Nagarajan | H04L 45/28 370/392 |
| 2012/0051236 A1* | 3/2012 | Hegde | H04L 63/1441 370/252 |
| 2014/0233565 A1* | 8/2014 | Mahapatra | H04L 45/74 370/392 |
| 2015/0237059 A1* | 8/2015 | Aoki | H04L 63/1441 726/23 |
| 2016/0094433 A1* | 3/2016 | Friedel | H04L 47/2408 709/240 |
| 2016/0119163 A1* | 4/2016 | Fadeev | H04L 12/6418 370/328 |
| 2016/0164834 A1* | 6/2016 | Jager | H04L 63/0236 726/13 |
| 2016/0248749 A1* | 8/2016 | Mahapatra | H04L 63/08 |
| 2016/0315921 A1* | 10/2016 | Dara | H04L 41/28 |
| 2017/0111319 A1* | 4/2017 | Jager | H04L 63/0236 |
| 2017/0264600 A1* | 9/2017 | Froelicher | H04L 61/6004 |
| 2017/0310594 A1* | 10/2017 | Kotha | H04L 49/25 |
| 2018/0288015 A1* | 10/2018 | Kudaraya | H04L 9/0861 |
| 2018/0337856 A1* | 11/2018 | Previdi | H04L 45/308 |

* cited by examiner

METHOD AND SYSTEM HAVING AN APPLICATION FOR IPV6 EXTENSION HEADERS AND DESTINATION OPTIONS

FIELD OF THE INVENTION

The present invention relates to a method and system for processing data packets using an application, which filters data packets, and more particularly to a method and system having an application for prioritization, selection, and modification of Internet Protocol version 6 (IPv6) extension headers and destination options, which can avoid packets being dropped on the network destination path, for example, due to extension header size, fragmentation issues, and/or middle box extension headers recognition issues.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. Currently, both protocol versions of the Internet Protocol Version 4-based (IPv4-based) Internet and the IPv6-based Internet coexist.

During the transition, existing IPv4 applications are able to work with the newer IPv6 enabled application using a dual-stack, which includes both an IPv4 protocol stack and an IPv6 protocol stack. The IPv6 network protocol provides that IPv6 hosts or host devices (for example, image forming apparatuses and other devices) can configure themselves automatically (i.e., stateless address autoconfiguration) when connected to an IPv6 network using ICMPv6 neighbor discovery messages (i.e., Neighbor Discovery Protocol or NDP). When first connected to a network, an IPv6 host sends a link-local multicast neighbor solicitation request advertising its tentative link-local address for double address detection (dad), if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

IPv6 extension headers carry optional internet layer information. Extension headers are to be examined and processed at the packet's destination only, except for Hop-by-Hop Options, which need to be processed at every intermediate node on the packet's path, including sending and receiving nodes. Extension headers are optional and should only appear at most once, except for the Destination Options header, which may appear twice. However, this is not often the case as firewalls, routers, and middleware boxes can be on the network path, and may drop these packets at their own selection. Thus, the final destination of these packets can rest on the network path (and corresponding intermediate nodes), rather than on the initiator (or receiver) of the data packets.

Accordingly, it would be desirable to have a mechanism, which allows a client or host device, for example, a multifunctional peripheral (MFP) to have improved interoperability with the IPv6 network by optimizing an IPv6 extension headers network path, which can solve various problems inherent with IPv6 extension headers, which may prevent communication between nodes, for example, two nodes within a communication network.

SUMMARY OF THE INVENTION

In consideration of the above issues, it would be desirable to have an application, for example, an application for a multi-functional peripheral (MFP) for prioritization, selection, and modification of IPv6 extension headers and destination options, and wherein the prioritization, selection, and modification of the IPv6 extension headers and destination options can avoid packets being dropped on the network destination path, for example, due to extension header size fragmentation issues or middle box extension headers recognition issues.

In accordance with an exemplary embodiment, a system is disclosed that facilitates processing of data packets in an Internet Protocol (IP) network environment, the system comprising: a computer device, the computer device having an Internet Protocol version 6 (IPv6) extensions application, which runs on an operating system of the computer device in communication with an IPv6 network, and wherein the IPv6 extensions application performs the following steps: setting an IPv6 extension header policy for the computer device; retrieving an original IPv6 packet from a network stack on the computer device, the original IPv6 packet having an extension header or destination option; determining if a designated route in the extension header or destination option is in accordance with the IPv6 extension header policy for the computer device; and if the designated route is in accordance with the IPv6 extension header policy, modifying the extension header or destination option in accordance with the IPv6 extension header policy for the computer device to generate a modified IPv6 packet, and sending the modified IPv6 packet on the IPv6 network; or if the designated route is not in accordance with the IPv6 extension header policy for the computer device, sending the original IPv6 packet on the IPv6 network.

In accordance with a further exemplary embodiment, a method is disclosed of enabling a computer device to process data packets in an Internet Protocol (IP) network environment, the method comprising: providing an Internet Protocol version 6 (IPv6) extensions application, which runs on an operating system of the computer device, and where the IPv6 extensions application is configured to execute the following steps: setting an IPv6 extension header policy for the computer device; retrieving an original IPv6 packet from a network stack on the computer device, the original IPv6 packet having an extension header or destination option; determining if a designated route in the extension header or destination option is in accordance with the IPv6 extension header policy for the computer device; and if the designated route is in accordance with the IPv6 extension header policy, modifying the extension header or destination option in accordance with the IPv6 extension header policy for the computer device to generate a modified IPv6 packet, and sending the modified IPv6 packet on the IPv6 network; or if the designated route is not in accordance with the IPv6 extension header policy for the computer device, sending the original IPv6 packet on the IPv6 network.

In accordance with an exemplary embodiment, a computer program product comprising a non-transitory computer usable medium having a computer readable code embodied therein for controlling a computer device is disclosed, the computer readable program code configured to cause an application running on an operating system of the computer device to process data packets, the process comprising: setting an Internet Protocol version 6 (IPv6) extension header policy for the computer device; retrieving an original IPv6 packet from a network stack on the computer device, the original IPv6 packet having an extension header or destination option; determining if a designated route in the extension header or destination option is in accordance with the IPv6 extension header policy for the computer device; and if the designated route is in accordance with the IPv6 extension header policy, modifying the extension header or destination option in accordance with the IPv6 extension header policy for the computer device to generate a modified IPv6 packet, and sending the modified IPv6 packet on the IPv6 network; or if the designated route is not in accordance with the IPv6 extension header policy for the computer device, sending the original IPv6 packet on the IPv6 network.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
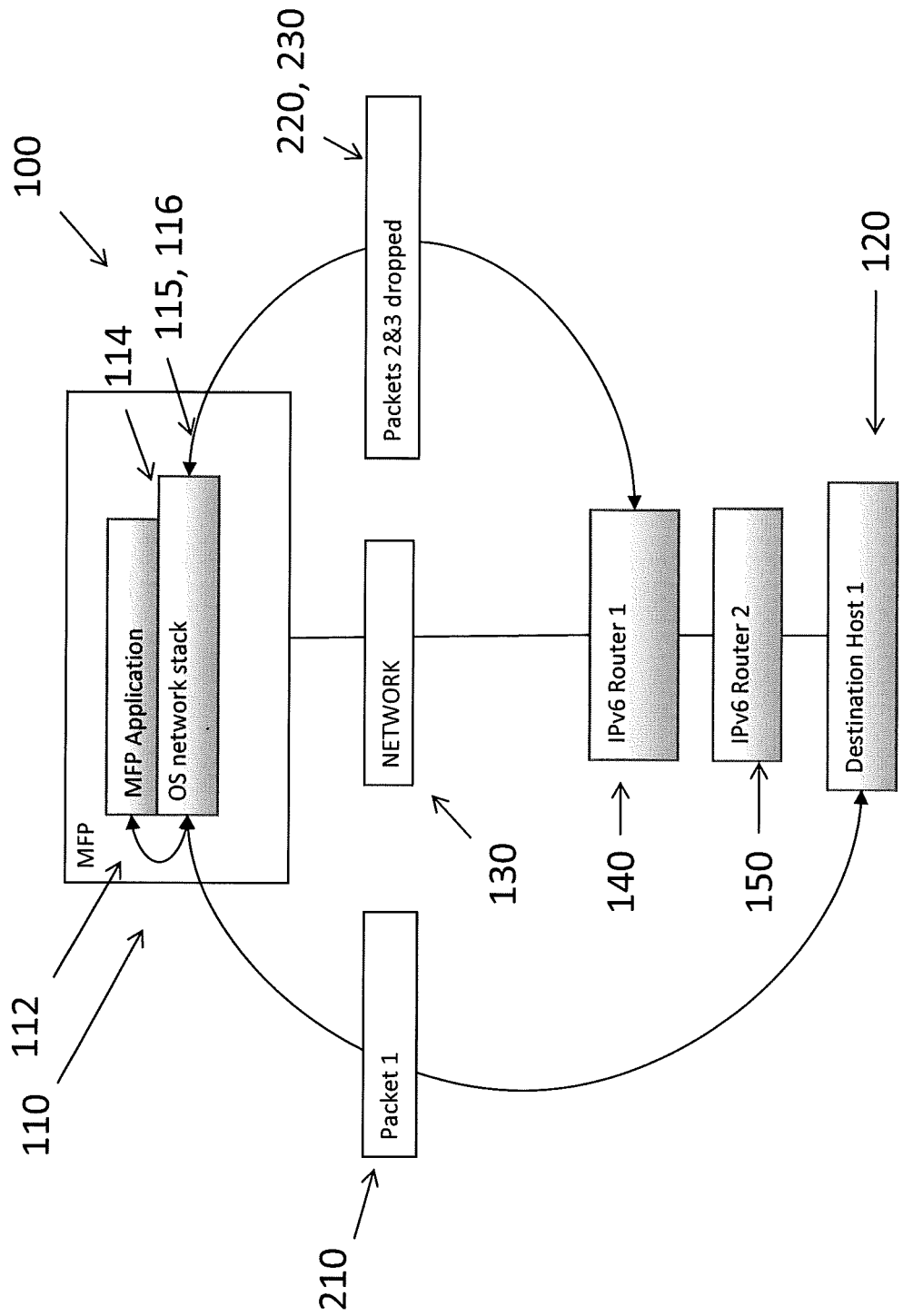
FIG. 1 is an illustration of a network system, which includes a client device or host device, for example, a Multi-functional Peripheral (MFP) having an application, which can prioritize, select, and modify IPv6 extension headers and destination options in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a network system 100, which can include a client device or host device 110, for example, a multi-functional peripheral (MFP) 112 having an application, which can prioritize, select, and modify IPv6 extension headers and destination options in accordance with an exemplary embodiment. As shown in FIG. 1, the system 100 can include a client device or host device 110, for example, a multi-functional peripheral (MFP) or image forming apparatus 112, a destination host device 120 (Destination Host 1), one or more IPv6 routers 140, 150 (IPv6 Router 1, IPv6 Router 2) and a communication network 130. The communication network 130 is configured to connect the client device or host device 110, the destination device 120, and the one or more IPv6 routers 140, 150 to one another. In accordance with an exemplary embodiment, the client device or host device 110, the MFP 112, the destination device 120, and the one or more IPv6 routers 140, 150 can be a computer device.

In accordance with an exemplary embodiment, examples of communication networks 130 consistent with embodiments of the invention include, but are not limited to, the Internet, an Intranet, a local area network (LAN) and a wide area network (WAN). In accordance with an exemplary embodiment, the client device or host device 110, the destination host 120, and the one or more IPv6 routers 140, 150, can be connected, for example, with a wireless connection by using radio frequency (RF), infrared (IR) transmission, IEEE1394 and/or other suitable wireless technology.

In accordance with an exemplary embodiment, the client device or host device 110 can include a processor or central processing unit (CPU), and one or more memories for storing software programs and data (such as files to be printed). The processor or CPU carries out the instructions of a computer program, which operates and/or controls at least a portion of the functionality of the client device or host device 110. The client device or host device 110 also includes an operating system (OS) 115, which manages the computer hardware and provides common services for efficient execution of various software programs. For example, the software programs can include application software and printer driver software.

In accordance with an exemplary embodiment, the client device or host device 110 is a multi-function peripheral (MFP) 112, which includes at least a copy function, an image reading function, a facsimile (fax) function, and a printer function, and forms an image on a sheet based on a print job (print instruction) received, for example, from the destination host 120. For example, the destination host 120 can be a mobile device, a smart phone, a personal digital assistant, a personal computer, a camera, a router, a MFP, an image forming apparatus, a printer, and/or a medical device or apparatus. In accordance with an exemplary embodiment, the communication network 130 communicates and transmits data via an IPv6 protocol. The destination host 120 can be configured to submit print jobs to the client device or host device 110 by transmitting data representing the documents to be printed and information describing the print job. In accordance with an exemplary embodiment, the client device or host device 110 is a multi-function peripheral (MFP) or printer 112, which includes a printer controller (or firmware), a memory section preferably in the form of a hard disk drive (HDD), an image processing section (or data dispatcher), a print engine, and an input/output (I/O) section.

In accordance with an exemplary embodiment, the destination host device 120, which may be embodied by a smart phone, a smart tablet, a person computer, a camera, a router, a medical device or apparatus, or a MFP (or printer), and generates the print data usable, for example, in the client device or host device 110, which can be, for example, a printer, a print server, or multi-function peripheral (MFP) 112. In accordance with an exemplary embodiment, the destination host device 120 can include a printer driver program (hereinafter, sometimes simply referred to as a printer driver), and the destination host device 120 can use the function of the printer driver to generate a print job including the data of print conditions to be applied at the time of image formation, and image data, and sends the generated print job to the client or host device 110, for example, which can be an MFP or printer 112.

In accordance with an exemplary embodiment, the one or more IPv6 routers 140, 150, can be networking devices that forward data packets (Packet 1, Packet 2, Packet 3) 210, 220, 230 between computer networks, for example, over the communication network 130. The data packet 210, 220, 230 can be forwarded from one router, for example, IPv6 router 140 to another router, for example, IPv6 router 150, through the communication network 130 that constitute an internetwork until it reaches its destination node, for example, the destination host 120. In accordance with an exemplary embodiment, the one or more IPv6 routers 140, 150 can be connected to two or more data lines from different networks. When a data packet, for example, an IPv6 data packet, comes in on one of the lines, the one or more IPv6 routers 140, 150, reads the network address information in the IPv6 packet to determine the ultimate destination. Then, using information in its routing table or routing policy, the one or more IPv6 routers 140, 150 can direct the IPv6 packet to the next network on its journey. For example, as shown in FIG. 1, the IPv6 packet 210 is successfully transmitted via the one or more IPv6 routers 140, 150 over the communication network 130 to the destination host 120. However, as shown, for example, in FIG. 1, IPv6 packets 220, 230 may not be successfully transmitted to the destination host, for example, the packets may be dropped, for example, by the IPv6 router 140 as a result of an IPv6 extension header of the IPv6 packet 220, 230 being incompatible or having inoperability issues as disclosed herein.

Figure 2:
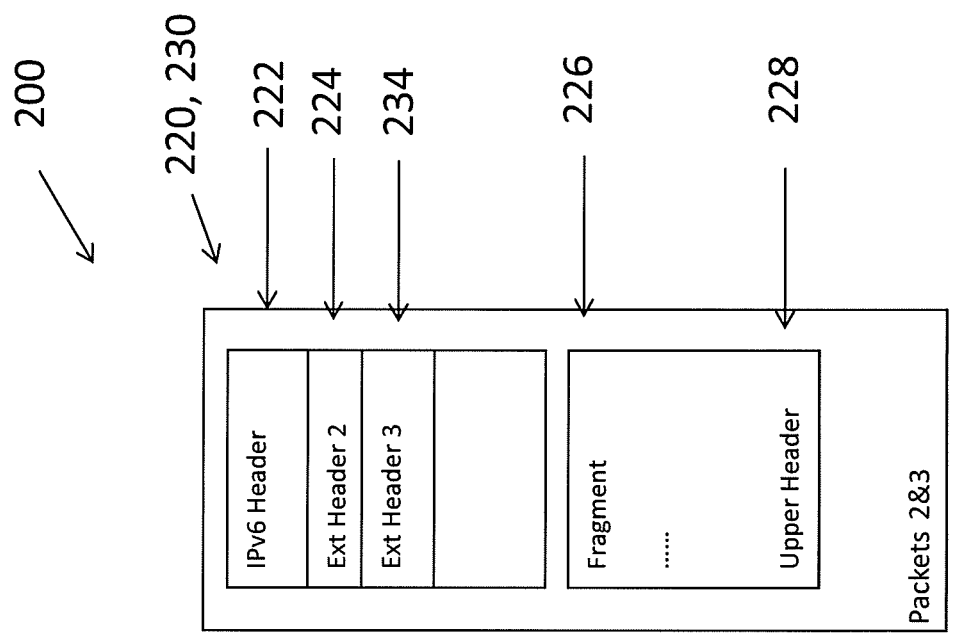
FIG. 2 is an illustration of network packets having IPv6 extension headers and destination headers in accordance with an exemplary embodiment.
Figure 2:
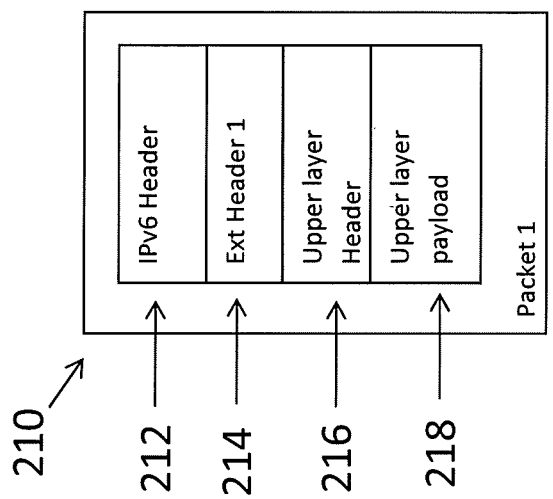

As shown in FIG. 2, the IPv6 packet 210, 220, 230 is a message entity exchanged via the Internet Protocol across the Internet Protocol version 6 (IPv6) network. In accordance with an exemplary embodiment, the IPv6 packet 210 can consist of control information for addressing and routing, and a payload consisting of user data. The control information in IPv6 packets 210, 220, 230 is subdivided into a mandatory fixed header (IPv6 header) 212, an extension header 214 (Ext Header 1), an upper layer header (Upper layer Header) 216, and an upper layer payload (Upper layer payload) 218. The extension headers form a change, using the "Next Header" field, which in the fixed header indicates the type of the first extension header. The Next Header field of the last extension header indicates the type of the upper-layer protocol header in the payload of the packet. The payload of an IPv6 packet is typically a datagram or segment of the higher-level Transport Layer protocol, but may be data for an Internet Layer, for example, ICMPv6, or Link Layer, for example, OSPF instead.

Alternatively, in accordance with an exemplary embodiment, the IPv6 packet 220, 230, may include the mandatory fixed heater (IPv6 Header) 222, extension headers 224, 234, a fragment extension header 226, an upper layer header and an upper layer payload 228. In order to send a packet that is larger than the path maximum transmission unit (mtu), the sending device 110, 112, 120, can split the packets into fragments. The fragment extension header 226 carries the information necessary to reassembly the original (unfragmented packet).

The fixed header 212 of an IPv6 packet 210 consists of its first 40 octets (220 bits). The extension headers (or destination options) 214, which can carry optional Internet Layer information are placed between the fixed header 212 and the upper-layer protocol header 216. In accordance with an exemplary embodiment, extension headers are defined in the IPv6 Request for Comments (RFC), and can include, for example, Hop-by-Hop options, destination options (before routing header), routing, fragment, authentication header (AH), encapsulating security payload (ESP), destination options (before upper-layer header) and mobility (for example, currently without upper-layer header). The upper layer header 216, for example provides data for the transport layer, for example, a TCP segment or a UDP datagram. The type of payload contained in the packet is contained within the upper-layer payload 218.

In accordance with an exemplary embodiment, data may be transmitted between the client device or host device 110 and the destination host 120 in encrypted or unencrypted form between the nodes of the communication network (or network) 130 using a variety of different communication protocols including, for example, various Internet layer, transport layer, or application layer protocols. For example, data may be transmitted via the networks 130 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

As shown in FIG. 1, the client device or host device 110 can have an IPv6 extensions application (or software module) 114, which captures (or intercepts) outgoing and incoming data packets from the Operating System (OS) 115 and network stack 116 having extension headers and destination options pursuant to the IPv6 protocol. In accordance with an exemplary embodiment, the IPv6 extensions application (or software module) 114 is preferably an application level module, which is configured to prioritize, select, and modify IPv6 packets having extension headers and destination options as disclosed herein. In accordance with an exemplary embodiment, for example, if the client device or host device 110 is a MFP or printer 112, the application (or software module) 114 can be part of the printer driver and/or firmware of the printer or MFP 112, or a separate software module or application, or part to the operating system of the MFP or printer 112.

In accordance with an exemplary embodiment, the IPv6 extensions application (or software module) 114, can allow a user with the ability to check, or modify the IPv6 extension headers independent of the operating system. For example, the application 114 can provide the client device or host device 110 and the destination host 120 with improved interoperability with the IPv6 network, by providing data packets 210 with an optimal or an optimized IPv6 extension header network path.

In accordance with an exemplary embodiment, for example, an administrator can set the application 114 to execute automatic auto corrections for a certain destination or route. For example, IPv6 extension headers can have issues, and as such, usage of IPv6 extension headers has been updated in the latest IPv6 RFC 8200 standard. One of the requirements is for the extension headers to be localized in the first fragment of a packet. However, many host devices (for example, a destination host 120) in the network (or field) may not be updated. In addition, another issue that may arise with extension headers is that although the standard does not allow for any intermediate host/router to inspect the extension header options, many routers and middleware boxes may filter certain packets in a certain way for interoperability, for example, for security reasons (See RFC 7045). In light of these issues, it would be desirable to control IPv6 extension headers regardless and independently from the operating system (OS) 115.

In accordance with an exemplary embodiment, it would be desirable for an administrator to be able to control, which characteristics of the IPv6 packets are desired and their priorities, for example, for interoperability, fragmentation, and/or security. For example, interoperability can mean that once the network preferences of the route is learned for such network is more convenient to use previous RFC 2460 definition than new RFC 8200 for interoperability purposes. Fragmentation can mean once the path maximum transmission unit (mtu) is learned by using the results from the path mtu protocol RFC 8201, the IPv6 extension packet headers should not be fragmented. Security reasons can mean an extension packet header is required or not required and the application should eliminate packets accordingly before even sending network traffic.

Figure 4:
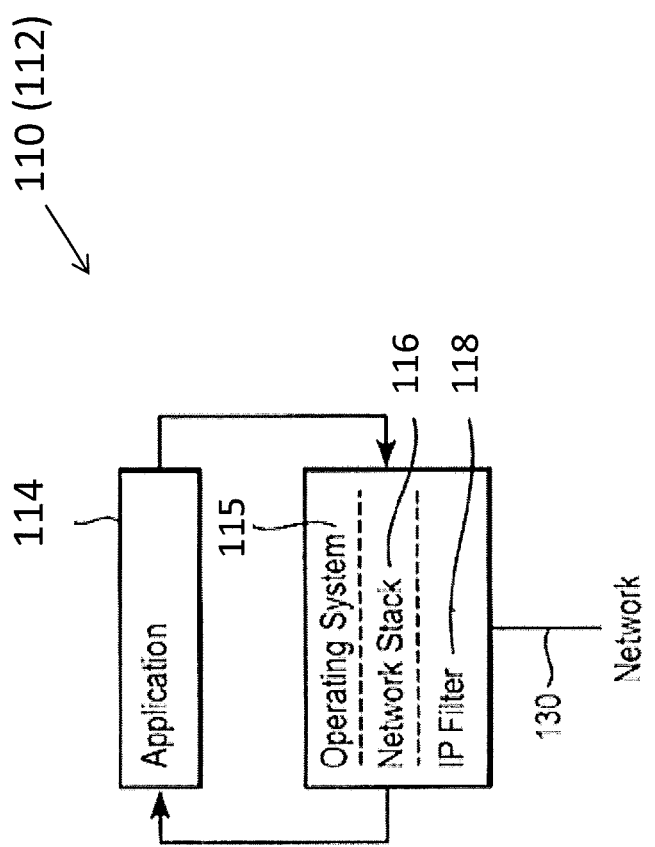
FIG. 4 is an illustration of an IP filter for capturing IPv6 packets from a network layer in accordance with an exemplary embodiment.

In accordance with an exemplary embodiment, as an example, the new RFC 8200 requires all headers to go in the first fragment. For previous MFPs 112 in a network system or field this may be an issue as the whole operating system (OS) 115 may need to be changed, however, in accordance with an exemplary embodiment, an IPv6 extensions application 114 as disclosed herein can make use of network packet filters, for example, as shown in FIG. 4, a Berkeley socket filters, or any available packet filter functionality on the OS 115, for example, as disclosed in commonly owned U.S. Pat. Nos. 8,432,907 and 8,699,483. In accordance with an exemplary embodiment, regardless of the operating system when an IPv6 packet 210, 220, 230 is generated, the IPv6 packet 210, 220, 230 can be passed to the application 114, which will have a configuration and network database available to modify the packet 210, 220, 230 according to the priorities set by the administrator.

In accordance with an exemplary embodiment, for example, in a print shop or an office environment having at least one MFP or printer 112, if an administrator decides it is not necessary to support mobile extension headers since most of the printing will be done in the office environment, the IP mobile header extensions can be dropped for security reasons by the IPv6 extensions application 114, for example, based on the IPv6 extension header policy set by the administrator. In accordance with an exemplary embodiment, the administrator can also set the IPv6 extension header policy based on selected IPv6 extension headers in the client device or host device 110, for example, an MFP 112 based on company policies, for example, related to security.

In accordance with an exemplary embodiment, for example, an IPv6 extension header policy for the client device or host device 110 or MFP 112 can be set such that the client device or host device 110 or MFP 112 is configured such that IPv6 mobile extension headers cannot be sent or accepted in any of its packets.

In accordance with an exemplary embodiment, for example, if the IPv6 header is not compatible with the new RFC definition, and the extension headers are being sent fragmented on two different fragments, the fragments may be dropped by a newer router which can interrupt communications between devices or hosts 110, 112, 120. In accordance with an exemplary embodiment, the application 114 can record the network path and redesigns the package to use new extension header definitions, which can successfully deliver the IPv6 packet to a destination device or host 110, 112, 120.

In accordance with an exemplary embodiment, the IPv6 extension policy for the IPv6 extensions application 114 can be set to avoid fragmentation, interoperability, security, and other related issues with IPv6 extension headers. In addition, by use of an IPv6 extensions application 114 as disclosed herein, the operability can be transparent to all applications on or associated with device or hosts 110, 112, 120, and to the network layer of the OS 115 and network stack 116. Accordingly, in accordance with an exemplary embodiment, the host or device 110, 112, 120 will not depend on the network layer being updated with such information.

In accordance with an exemplary embodiment, for example, when a packet is generated by the client device or host device 110 and sent to the network layer, a filter, for example, a network filter 118 (FIG. 4) extracts the packet 210, 220, 230, which is then forwarded to the IPv6 extensions application 114. The IPv6 extensions application 114 will determine if the route in the extension header or destination options 214 has been recorded (for example, in a database) at the IPv6 extensions application layer, the packet 210 can be modified (modified IPv6 packet) according to the record of the route in the extension header or destination options 214.

In accordance with an exemplary embodiment, if there is no record of the extension header or destination option of the IPv6 packet 220, 230, the IPv6 packet 220, 230 can be sent on the network 130 without modification (i.e., original IPv6 packet). If the original IPv6 packet is dropped on the network 130, the IPv6 extensions application 114 will retry sending the packet 220, 230 with a priority configuration (or priority configuration selection), which adds or remove extension headers (or destination options) 224, 234 according to the administrator-selected rules.

In accordance with an exemplary embodiment, if there is an interoperability issue with the original IPv6 packet 220, 230 for example, the network path not recognizing the IPv6 extension header, the IPv6 extensions application 114 can automatically modify the original IPv6 packet in accordance with the IPv6 extension header policy set by the administrator.

Figure 3:
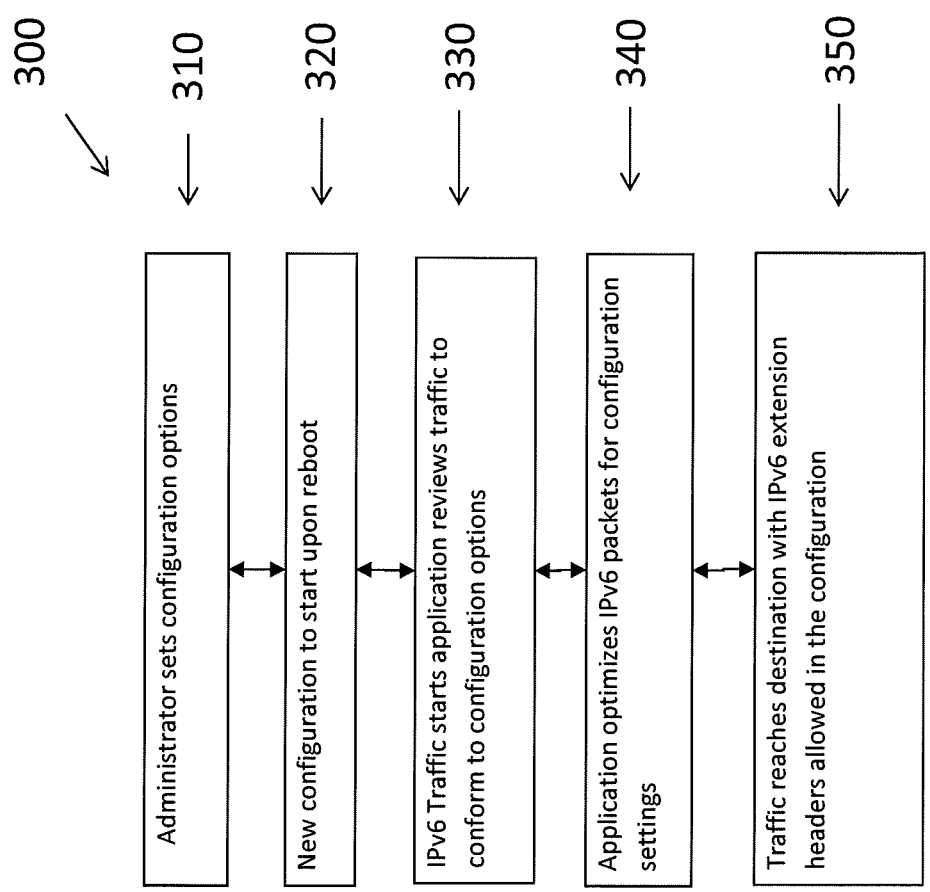
FIG. 3 is a flow chart showing another exemplary embodiment of an implementation of an application, which uses IPv6 extension headers and destination options in accordance with an exemplary embodiment.

FIG. 3 is a flow chart 300 showing an exemplary embodiment of an implementation of an IPv6 extensions application 114, which uses IPv6 extension headers in accordance with an exemplary embodiment. As shown in FIG. 3, in step 310, an administrator can set configuration options for each of the data packets being sent, for example, by the MFP 112. In accordance with an exemplary embodiment, the configuration settings can be accessed by the IPv6 extensions application 114. In step 320, upon rebooting of the MFP 112, the configuration setting (i.e., new configurations) in step 310 are applied to IPv6 data packets in the IPv6 extensions application 114 to generated, for example, a modified IPv6 packet as disclosed herein. In step 330, the IPv6 extensions application 115 reviews IPv6 traffic to confirm that the IPv6 packets conform to the configuration options. In step 340, the IPv6 extensions application 114 optimizes the IPv6 packets in accordance with the configuration settings. In step 350, the data packet (or traffic) 210, reaches the destination (for example, destination host 120) with the IPv6 extension headers, which are allowed in the configuration settings and which have previously been, for example, recorded as an extension header or destination option, which can be sent and received from the destination host 120.

FIG. 4 is an illustration of an IP filter 118 for capturing IPv6 packets from a network layer 116 in accordance with an exemplary embodiment. As shown in FIG. 4, the client device or host device 110, for example, the MFP 112 has an IPv6 extensions application (or software module) 114 and an IP filter (or packet capture filter) 118, which captures (or intercepts) outgoing and incoming data packets having IPv6 extension headers and destination options pursuant to the IPv6 protocol. In accordance with an exemplary embodiment, the IPv6 extensions application (or software module) 114 is preferably an application level module, which is configured to modify, change, and judge IPv6 packets as disclosed herein. In accordance with an exemplary embodiment, the IPv6 extensions application 114 can be part of the printer driver and/or firmware of the client device or host devices 110 or MFP 112, or a separate software module or application, or part to the operating system (OS) of the client device or host device 110, or MFP 112. In accordance with an exemplary embodiment, the IP filter 118 forwards the incoming or outgoing IPv6 packets as disclosed In accordance with an exemplary embodiment, the IPv6 packets (or packages) are preferably broadcast and/or sent out via the IPv6 communicationn network 130, for example, the Internet. In accordance with an exemplary embodiment, the IP filter 118 preferably captures the IPv6 packet before the initial broadcast (i.e., Neighbor Discovery) and/or alternatively, before the packet is sent to the Network Stack 116 for processing. In accordance with an exemplary embodiment, the IPv6 extensions application's 114 functionality can also be enabled or disabled at will by a network administrator or other designated individual.

In accordance with an exemplary embodiment, the client device or host device 110, the MFP 112, or the destination host 120 can include an operating system 115 (OS), which acts as an interface between the device's hardware and application programs, and which is also responsible for the management and coordination of activities and the sharing of the resources within host devices. In accordance with an exemplary embodiment, the IPv6 extensions application 114 runs on the operating system 115 of the client device or host device 110, the MFP 112, or the destination host 120, and the network layer is under or a part of the operating system 115. It can be appreciated that by utilizing an IPv6 extensions application 115 as described herein, the operating system of the client device or host device 110, the MFP 112, or the destination host 120 does not need to be altered or changed in anyway. Alternatively, it can be appreciated that in accordance with another exemplary embodiment, the operating system (OS) 115 can be configured to perform the methods as described herein.

In accordance with an exemplary embodiment, a computer program product comprising a non-transitory computer usable medium having a computer readable code embodied therein for controlling a computer device is disclosed, the computer readable program code configured to cause an application running on an operating system of the computer device to process data packets, the process comprising: setting an Internet Protocol version 6 (IPv6) extension header policy for the computer device; retrieving an original IPv6 packet from a network stack on the computer device, the original IPv6 packet having an extension header or destination option; determining if a designated route in the extension header or destination option is in accordance with the IPv6 extension header policy for the computer device; and if the designated route is in accordance with the IPv6 extension header policy, modifying the extension header or destination option in accordance with the IPv6 extension header policy for the computer device to generate a modified IPv6 packet, and sending the modified IPv6 packet on the IPv6 network; or if the designated route is not in accordance with the IPv6 extension header policy for the computer device, sending the original IPv6 packet on the IPv6 network.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system that facilitates processing of data packets in an Internet Protocol (IP) network environment, the system comprising:

a computer device, the computer device having an Internet Protocol version 6 (IPv6) extensions application, which runs on an operating system of the computer device in communication with an IPv6 network, and wherein the IPv6 extensions application performs the following steps:

setting an IPv6 extension header policy for the computer device, the IPv6 extension header policy having a database of designated routes for extension headers or destination options, the database of designated routes for extension headers or destination options being a list of extension headers or destination options that are to be modified for interoperability, fragmentation, and/or security reasons;

retrieving an original IPv6 packet from a network stack on the computer device before the IPv6 packet is sent on the IPv6 network, the original IPv6 packet having an extension header or destination option;

determining if a designated route in the extension header or destination option is in the database of designated routes for extension headers or destination options;

when the designated route is in the database of designated routes for extension headers or destination options, modifying the extension header or destination option in accordance with the IPv6 extension header policy for the computer device to generate a modified IPv6 packet, and sending the modified IPv6 packet on the IPv6 network; or when the designated route is not in the database of designated routes for extension headers or destination options for the computer device, sending the original IPv6 packet on the IPv6 network; and when the original IPv6 packet is not successfully transmitted to a destination host, updating the database of designated routes for extension headers or destination options to include the designated route in the extension header or destination option for the original IPv6 packet that was not successfully transmitted to the destination host, and wherein the IPv6 extensions application modifies the original IPv6 packet by adding or removing the extension header or destination option in accordance with the IPv6 extension header policy and resends the modified original IPv6 packet on the IPv6 network.

2. The system of claim 1, comprising:

dropping the original IPv6 packet on the IPv6 network, and when the original IPv6 packet is dropped on the IPv6 network, the IPv6 extensions application modifies the original IPv6 packet by adding or removing the extension header or destination option in accordance with the IPv6 extension header policy and resends the modified original IPv6 packet on the IPv6 network.

3. The system of claim 2, further comprising:

updating the database of designated routes for extension headers or destination options to include the extension header or destination option for the dropped original IPv6 packet.

4. The system of claim 1, when the original IPv6 packet has an interoperability issue with a network path, the IPv6 application automatically modifies the original IPv6 packet by adding or removing the extension header or destination option in accordance with the IPv6 extension header policy and resends the modified original IPv6 packet on the IPv6 network.

5. The system of claim 1, wherein the IPv6 extension header policy is configured such that IPv6 mobile extension headers are not recognized by the computer device for outgoing IPv6 packets or incoming IPv6 packets.

6. The system of claim 1, when the original IPv6 packet has an IPv6 extension header, which is not compatible with a Request for Comments (RFC) definition, and the original IPv6 packet is being dropped by a router, the IPv6 extensions application records a network path and redesigns the IPv6 packet to use a new IPv6 extension header, which can successfully deliver the redesigned IPv6 packet to a destination device.

7. The system of claim 6, wherein the IPv6 extension header of the original IPv6 packet includes a fragment extension header, the fragment extension header configured to split the original IPv6 packet into two or more IPv6 packets, and wherein the router has an RFC, which is newer than a RFC under which the original IPv6 packet was generated.

8. The system of claim 1, wherein the computer device further includes a packet capture filter, which intercepts the original IPv6 packet and directs the IPv6 packet for processing by the IPv6 extensions application, the packet capture filter configured to capture the IPv6 packet from the operating system of the computer device.

9. The system of claim 1, wherein the computer device is a multi-functional peripheral (MFP), which includes one or more of the following:
   at least a copy function, an image reading function, a facsimile (fax) function, and a printer function, and forms an image on a sheet based on a print job; and
   wherein the IPv6 extensions application is part of a printer driver or firmware of the multi-functional peripheral (MFP).

10. A method of enabling a computer device to process data packets in an Internet Protocol (IP) network environment, the method comprising:
   providing an Internet Protocol version 6 (IPv6) extensions application, which runs on an operating system of the computer device, and where the IPv6 extensions application is configured to execute the following steps:
      setting an IPv6 extension header policy for the computer device, the IPv6 extension header policy having a database of designated routes for extension headers or destination options, the database of designated routes for extension headers or destination options being a list of extension headers or destination options that are to be modified for interoperability, fragmentation, and/or security reasons;
      retrieving an original IPv6 packet from a network stack on the computer device before the IPv6 packet is sent on the IPv6 network, the original IPv6 packet having an extension header or destination option;
      determining if a designated route in the extension header or destination option is in the database of designated routes for extension headers or destination options for the computer device;
   when the designated route is in the database of designated routes for extension headers or destination options, modifying the extension header or destination option in accordance with the IPv6 extension header policy for the computer device to generate a modified IPv6 packet, and sending the modified IPv6 packet on the IPv6 network; or
   when the designated route is not in the database of designated routes for extension headers or destination options for the computer device, sending the original IPv6 packet on the IPv6 network; and
   when the original IPv6 packet is not successfully transmitted to a destination host, updating the database of designated routes for extension headers or destination options to include the designated route in the extension header or destination option for the original IPv6 packet that was not successfully transmitted to the destination host, and wherein the IPv6 extensions application modifies the original IPv6 packet by adding or removing the extension header or destination option in accordance with the IPv6 extension header policy and resends the modified original IPv6 packet on the IPv6 network.

11. The method of claim 10, comprising:

dropping the original IPv6 packet on the IPv6 network; and when the original IPv6 packet is dropped on the IPv6 network, the IPv6 extensions application modifies the original IPv6 packet by adding or removing the extension header or destination option in accordance with the IPv6 extension header policy and resends the modified original IPv6 packet on the IPv6 network.

12. The method of claim 11, further comprising:

updating the database of designated routes for extension headers or destination options to include the extension header or destination option for the dropped original IPv6 packet.

13. The method of claim 10, when the original IPv6 packet has an interoperability issue with a network path, the IPv6 application automatically modifies the original IPv6 packet by adding or removing the extension header or destination option in accordance with the IPv6 extension header policy and resends the modified original IPv6 packet on the IPv6 network.

14. The method of claim 10, wherein the IPv6 extension header policy is configured such that IPv6 mobile extension headers are not recognized by the computer device for outgoing IPv6 packets or incoming IPv6 packets.

15. The method of claim 10, when the original IPv6 packet has an IPv6 extension header, which is not compatible with a Request for Comments (RFC) definition, and the original IPv6 packet is being dropped by a router, the IPv6 extensions application records a network path and redesigns the IPv6 packet to use a new IPv6 extension header, which can successfully deliver the redesigned IPv6 packet to a destination device.

16. A computer program product comprising a non-transitory computer usable medium having a computer readable code embodied therein for controlling a computer device, the computer readable program code configured to cause an application running on an operating system of the computer device to process data packets, the process comprising:

setting an Internet Protocol version 6 (IPv6) extension header policy for the computer device, the IPv6 extension header policy having a database of designated routes for extension headers or destination options, the database of designated routes for extension headers or destination options being a list of extension headers or destination options that are to be modified for interoperability, fragmentation, and/or security reasons;

retrieving an original IPv6 packet from a network stack on the computer device before the IPv6 packet is sent on the IPv6 network, the original IPv6 packet having an extension header or destination option;

determining if a designated route in the extension header or destination option is in the database of designated routes for extension headers or destination options;

when the designated route is the database of designated routes for extension headers or destination options, modifying the extension header or destination option in accordance with the IPv6 extension header policy for the computer device to generate a modified IPv6 packet, and sending the modified IPv6 packet on the IPv6 network; or when the designated route is not in the database of designated routes for extension headers or destination options for the computer device, sending the original IPv6 packet on the IPv6 network; and when the original IPv6 packet is not successfully transmitted to a destination host, updating the database of designated routes for extension headers or destination options to include the designated route in the extension header or destination option for the original IPv6 packet that was not successfully transmitted to the destination host, and wherein the IPv6 extensions application modifies the original IPv6 packet by adding or removing the extension header or destination option in accordance with the IPv6 extension header policy and resends the modified original IPv6 packet on the IPv6 network.

17. The computer program product of claim 16, comprising:

dropping the original IPv6 packet on the IPv6 network; and when the original IPv6 packet is dropped on the IPv6 network, the IPv6 extensions application modifies the original IPv6 packet by adding or removing the extension header or destination option in accordance with the IPv6 extension header policy and resends the modified original IPv6 packet on the IPv6 network.

18. The computer program product of claim 17, further comprising:

updating the database of designated routes for extension headers or destination options to include the extension header or destination option for the dropped original IPv6 packet.

19. The computer program product of claim 16, when the original IPv6 packet has an interoperability issue with a network path, the IPv6 application automatically modifies the original IPv6 packet by adding or removing the extension header or destination option in accordance with the IPv6 extension header policy and resends the modified original IPv6 packet on the IPv6 network.

20. The computer program product of claim 16, wherein the IPv6 extension header policy is configured such that IPv6 mobile extension headers are not recognized by the computer device for outgoing IPv6 packets or incoming IPv6 packets.

* * * * *